United States Patent [19]

Marchionni et al.

[11] Patent Number: 5,969,192
[45] Date of Patent: Oct. 19, 1999

[54] PROCESS FOR PREPARING HYDROGEN-TERMINATED POLYOXYPERFLUOROALKANES

[75] Inventors: Giuseppe Marchionni; Gianfranco Spataro, both of Milan; Ezio Strepparola, Treviglio, all of Italy

[73] Assignee: Ausimont S.p.A., Milan, Italy

[21] Appl. No.: 08/769,861

[22] Filed: Dec. 19, 1996

Related U.S. Application Data

[63] Continuation of application No. 08/509,507, Jul. 28, 1995, abandoned.

[30] Foreign Application Priority Data

Aug. 5, 1994 [IT] Italy ................................. MI94A1712

[51] Int. Cl.⁶ ....................................................... C07C 43/11
[52] U.S. Cl. ............................................. 568/615; 568/614
[58] Field of Search ............................................... 568/615

[56] References Cited

U.S. PATENT DOCUMENTS

| | | | |
|---|---|---|---|
| 3,250,806 | 5/1966 | Warnell | 260/535 |
| 3,515,701 | 6/1970 | Van Dyke Tiers | 260/78.4 |
| 5,091,589 | 2/1992 | Meyer et al. | 568/615 |

FOREIGN PATENT DOCUMENTS

| | | |
|---|---|---|
| 0 154 297 A2 | 9/1985 | European Pat. Off. . |
| 1034926 | 7/1966 | United Kingdom . |
| WO 91/15616 | 10/1991 | WIPO . |

*Primary Examiner*—Raymond Henley, III
*Assistant Examiner*—Dwayne C. Jones
*Attorney, Agent, or Firm*—Bryan Cave LLP

[57] ABSTRACT

A process for preparing hydrogen-terminated polyoxyperfluoroalkanes having molecular weight lower than 1800, by decarboxylation of the corresponding polyoxyperfluoroalkanes having one or two end groups selected form $—OCF_2COOZ$, $—OCF_2CF_2COOZ$ and $—OCF(CF_3)COOZ$, wherein Z is an alkaline metal or ammonium, carried out in the presence of water at temperatures from 140°–170° C. and under a pressure of at least 4 atmospheres.

8 Claims, No Drawings

PROCESS FOR PREPARING HYDROGEN-TERMINATED POLYOXYPERFLUOROALKANES

This a continuation of U.S. application Ser. No. 08/509,507, filed Jul. 28, 1995.

The present invention relates to a process for preparing hydrogen-terminated polyoxyperfluoroalkanes having hydrogenated end groups and molecular weight lower than 1800 by decarboxylation of the alkaline salts obtained by hydrolysis and salification of the corresponding acylfluorides, carried out in the presence of water, at temperatures from 140 to 170° C. and under a pressure of at least 4 atm.

BACKGROUND OF THE INVENTION

The polyoxyperfluoroalkanes with hydrogenated end groups and molecular weight lower than 1800 have such chemical physical characteristics that they can be used as CFC and HCFC substitutes as expanding agents for polyurethanes, as refrigerants, as propellants for aerosol and as solvents.

Such polyoxyperfluoroalkanes are sufficiently free from harmful physiologic effects, have scarce influence on the global warming and as they do not contain chlorine are not damaging for the ozone layer, like CFC and HCFC.

DESCRIPTION OF THE PRIOR ART

It is known from EP patent 154,297 to prepare hydrogen-terminated polyoxyperfluoroalkanes by a decarboxylation process of the alkaline salts obtained from the corresponding polyoxperfluoroalkanes having acylfluoride —COF end groups, in the presence of solvents containing an active hydrogen as glycols and high boiling alcohols.

Polyoxyperfluoroalkanes having —OCF(CF$_3$)H end groups are prepared with yields around 70% by reaction of the corresponding polyoxyperfluoroalkanes terminated with the —OCF(CF$_3$)COF group with diethylene glycol and aqueous KOH at 175° C.

Such process wherein glycols or high boiling alcohols are used does not allow to obtain high yields and shows various drawbacks:

formation of undesired by-products, deriving from secondary reactions between glycol or alcohol with polyoxyperfluoroalkanes which hardly result separable, in case of the preparation of hydrogen-terminated polyoxyperfluoroalkanes having low molecular weight (lower than 1800) it is difficult to separate such products from the glycol or from the high boiling alcohol present in the reaction final mixture because of the little differences among their boiling points and their solubility parameters, alcoholates between glycol or alcohol and alkaline hydroxide are also formed at the decarboxylation temperatures giving rise to reactions of degradation type on the polyoxyperfluoroalkane chain, with substantial variation of molecular weights and consequent yield lowering in the product having the desired molecular weights distribution, i.e. substantially like that of the starting acylfluorides.

In U.S. Pat. No. 5,091,589 a process is described for preparing polyoxyperfluoroalkanes having an hydrogenated end group of —OCFHCF$_3$ type and average molecular weights of 2000–4000, by reaction of the corresponding acylfluorides with —OCF(CF$_3$)COF end group with an anhydrous solid alkali metal hydroxide, in absence of solvents, at temperatures from 90°–160° C., with yields of 93%.

By such process, however, it is not possible to prepare polyoxyperfluoroalkanes having hydrogenated end groups of —OCF$_2$H and/or OCF$_2$CF$_2$H type starting from the corresponding acylfluorides with —OCF$_2$COF and/or OCF$_2$CF$_2$COF end groups, since only the alkaline salts of said acylfluorides are obtained, i.e. products having —OCF$_2$COOM and/or —OCF$_2$CF$_2$COOM end groups, wherein M is an alkaline metal.

SUMMARY OF THE INVENTION

It has now been surprisingly found a process for preparing neutral polyoxyperfluoroalkanes, having 1 or 2 hydrogenated end groups and number average molecular weight lower than 1800, preferably lower than 1500, starting from the corresponding acylfluorides, which does not show the drawbacks reported by the known processes and which results applicable also to acylfluorides with —OCF$_2$COF and —OCF$_2$CF$_2$COF end groups, with high yields higher than 96%, substantially keeping unchanged the distribution of the molecular weights of the starting polyoxyperfluoroalkanes.

It has been in fact found that it is possible to obtain with yields higher than 96% hydrogen-terminated polyoxyperfluoroalkanes i.e. with end groups —OCF$_2$H, —OCF$_2$CF$_2$H or —OCF(CF$_3$)H, having molecular weights lower than 1800, by decarboxylation of salts, preferably of alkaline metals, obtained by hydrolysis and salification of the corresponding acylfluorides, carried out at 140°–170° C., in the presence of water and under a pressure of at least 4 atm, preferably between 6 and 10 atm, in particular when one continuously operates.

DETAILED DESCRIPTION OF THE INVENTION

Thus, it is an object of the present invention a process for preparing neutral polyoxyperfluoroalkanes, having 1 or 2 end groups selected from —OCF$_2$H, —OCF$_2$CF$_2$H and —OCF(CF$_3$)H and a number average molecular weight lower than 1800, preferably lower than 1500, consisting in decarboxylating the salts formed by the corresponding polyoxyperfluoroalkanes having one or two end groups selected from —OCF$_2$COOZ, —OCF$_2$CF$_2$COOZ and —OCF(CF$_2$) COOZ, wherein Z is a monovalent cation, in the presence of water, at pH between 5 and 9, at a temperature from 140 to 170° C. and under a pressure of at least 4 atmospheres.

Said starting salts are prepared by hydrolysis and salification, with aqueous solution of ammonium hydroxides or alkaline hydroxides, of polyoxyperfluoroalkanes having one or two end groups selected from —OCF$_2$COF, —OCF$_2$CF$_2$COF and —OCF(CF$_3$)COF and a number average molecular weight lower than 1800.

Said polyoxyperfluoroalkanes having at least an acylfluoride —COF end group are products known as such and are formed by fluorooxyalkylene units selected from the following:

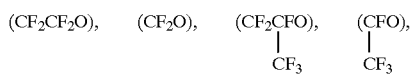

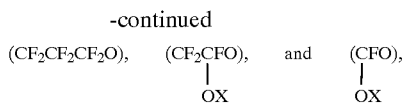

wherein X is —(CF$_2$)$_n$CF$_3$ and n=0, 1, 2, 3, 4, said units being statistically distributed in the polymeric chain, having one or two end groups selected from —OCF$_2$COF, —OCF$_2$CF$_2$COF and —OCF(CF$_3$)COF.

They can be obtained by photooxidation processes of fluorinated olefins (for instance hexafluoropropene and/or tetrafluoroethylene) or by oligomerization of perfluoroolefins epoxides such as for instance C$_2$F$_4$O and C$_3$F$_6$O.

The desired molecular weights can be directly obtained by synthesis or by catalytic cracking processes from products having higher molecular weight.

In the preparation of the aforesaid salts the polyoxyperfluoroalkanes having the following structures:

RfO (CF$_2$CF$_2$O)$_m$ (CF$_2$O)$_n$CF$_2$COF and

RfO (CF$_2$CF(CF$_3$)O)$_p$ (CF$_2$O)$_n$ (CF(CF$_3$)O)$_q$ CF$_2$COF can in particular be used, wherein Rf is CF$_3$ or CF$_2$COF and m, n, p and q have average values such as to meet the requirements of average molecular weight lower than 1800, preferably lower than 1500.

Said salts to be decarboxylated can be prepared separately or prepared in situ, in the same decarboxylation reactor, from the corresponding polyoxyperfluoroalkanes having one or more acylfluoride —COF end groups, with substantially stoichiometric amounts of ammonium or alkaline metals hydroxides in aqueous solution.

The Z cation of said salts is preferably selected from ammonium and alkaline metals, more preferably it is potassium.

The pH between 5 and 9 is automatically set if the starting salt is an alkaline metal or can be maintained by addition of buffer solutions.

The temperature at which said salts are reacted is preferably comprised between 150° C. and 160° C.

The process according to the present invention can be discontinuously or continuously carried out.

Some examples follow for illustrative purpose of the invention.

EXAMPLE 1

180 g of potassium salt of a α-ω-perfluoropolyoxyalkandioic acid obtained by hydrolysis and salification of a fraction having fluoroacylic end groups (—OCF$_2$COF), coming from tetrafluoroethylene and oxygen photooxidation, having the structure:

wherein T=—CF$_2$COOK, average MW of 514 and m/n=2.1, are loaded with 200 ml of water into a 400 ml autoclave equipped with inner probe for the survey of the temperature, rocking stirring, manometer, automatic vent valve set at 7 atm and connected to two condensers thermostated at 15° C. and 0° C. respectively. The internal temperature is brought to 150° C. and maintained for 10 hours.

After cooling it is discharged the reaction mass consisting in two phases: upper aqueous one containing KHCO$_3$ and lower organic one consisting of 117 g of fluorinated product which at the $^{19}$F NMR analysis results to have the following structure:

A O (CF$_2$CF$_2$O)$_m$ (CF$_2$O)$_n$ A wherein A=CF$_2$H, average MW of 595 and m/n=2.1 (theoretic yield=95.45%)

EXAMPLE 2 (COMPARATIVE)

200 g of potassium salt of a α-ω-perfluoropolyoxyalkandioic acid described in example 1, 250 ml of water and 150 g of ethylenglycol are loaded into an 1 l glass reactor equipped with blade stirrer, thermometric probe, Claisen cooled at 15° C. by means of circulating water in the jacket and connected to a 500 ml collecting flask.

The mixture is brought to 160° C. and maintained for 8 hours obtaining by distillation and subsequent separation from water 90.3 g (yield 66.3w) of fluorinated product which at the $^{19}$F NMR analysis results to have the following structure:

A O (CF$_2$CF$_2$O)$_m$(CF$_2$O)$_n$ A wherein A=CF$_2$H, average MW of 410 and m/n=2.3.

The $^1$H and $^{19}$F NMR analysis show the presence in the fluorinated product of 2% of by-products having the structure HOCH$_2$CH$_2$OCF$_2$H and HOCH$_2$CH$_2$F.

The off-gas are consisting of CO$_2$, CF$_3$H and CO. The residue in the reactor is consisting of ethylenglycol containing KF and KHCO$_3$.

EXAMPLE 3 (COMPARATIVE)

100 g of potassium salt of a α-ω-perfluoropolyoxyalkandioic acid described in example 1, 100 ml of water and 30 g of 85% KOH are loaded into a 250 ml glass reactor equipped with blade stirrer, thermometric probe, Claisen cooled at 15° C. by means of circulating water in the jacket and connected to a 250 ml collecting flask.

The mixture is brought up to 155° C. under stirring obtaining by distillation and subsequent separation from water 14 g (yield 20.5%) of fluorinated product which at the $^{19}$F NMR analysis results to have the following structure:

A O (CF$_2$CF$_2$O)$_m$(CF$_2$O)$_n$ A wherein A=CF$_2$H, average MW of 380 and m/n=2.2.

In the dry residuum of distillation, KF and starting product are present (IR absorption 1680 cm$^{-1}$).

EXAMPLE 4

250 g of potassium salt of a perfluoropolyoxyalkanoic acid obtained by hydrolysis and salification of a fraction having fluoroacylic end groups (—OCF$_2$COF), coming from hexafluoropropene and oxygen photooxidation, having the structure:

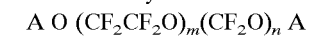

wherein T=CF$_3$, T'=CF$_2$COOK, X=F, CF$_3$, p/q=40 and average MW=450, are loaded with 200 ml of water into a 400 ml autoclave equipped with inner probe for the survey of the temperature, rocking stirring, manometer, automatic vent valve set at 7 atm and connected to two condensers thermostated at 150° C. and 0° C. respectively. The reactor temperature is brought to 160° C. and maintained for 10 hours. After cooling and separation of water, 200 g of fluorinated product are obtained which at the $^{19}$F NMR analysis results to have the following structure:

A O(CF$_2$CF(CF$_3$)O)$_p$ (CF(X)O)$_q$ A' wherein A=CF$_3$, A'=CF$_2$H, p/q=40 and average MW of 368 (yield=97.8%).

EXAMPLE 5 (COMPARATIVE)

200 g of potassium salt of a perfluoropolyoxyalkanoic acid described in example 4, 250 ml of water and 150 g of ethylene glycol are loaded into a 1 l glass reactor equipped with blade stirrer, thermometric probe, Claisen cooled at 15° C. by means of circulating water in the jacket and connected to a 500 ml collecting flask.

The mixture is brought up to 160° C. and maintained for 8 hours obtaining by distillation and subsequent separation from water 116 g (yield 70.9%) of fluorinated product which at the $^{19}$F NMR analysis results to have the following structure:

A O $(CF_2CF(CF_3)O)_p$ $(CF(X)O)_q$ A' wherein A=$CF_3$, A'=$CF_2$H, X=F, $CF_3$ and having an average MW of 390 and p/q=40.

The $^1$H- and $^{19}$F-NMR analysis show the presence of 1% of products having the structure $HOCH_2CH_2OCF_2H$ and $HOCH_2CH_2F$.

In the dry residuum of distillation, KF and starting product are present (IR absorption 1680 cm$^{-1}$).

EXAMPLE 6 (COMPARATIVE)

100 g of potassium salt of a perfluoropolyoxyalkanoic acid described in example 4, 100 ml of water and 15 g of 85% KOH are loaded into a 250 ml glass reactor equipped with blade stirrer, thermometric probe, Claisen cooled at 15° C. by means of circulating water in the jacket and connected to a 250 ml collecting flask.

The mixture is brought up to 155° C. under stirring obtaining by distillation and subsequent separation from water 29 g (yield 35.5%) of fluorinated product which at the $^{19}$F NMR analysis results to have the following structure:

A O $(CF_2CF(CF_3)O)_p$ $(CF(X)O)_q$ A' wherein A=$CF_3$, A'=$CF_2$H, X=F, $CF_3$ and having an average MW of 375 and p/q=40.

In the dry residuum, KF and starting product are present (IR absorption 1680 cm$^{-1}$).

EXAMPLE 7 (COMPARATIVE)

Polyoxyperfluoroalkanes having —$CF_2COF$ end groups were treated according to the process described in U.S. Pat. No. 5,091,589.

207 g of potassium salt of a α-ω-perfluoropolyoxyalkanediacyl fluoride having the following structure:

$FOCCF_2O$ $(CF_2CF_2O)_m$ $(CF_2O)_n CF_2COF$ with average mw=1800 and m/n=1, are loaded into a 500 ml reactor.

15.2 g of solid KOH are loaded by screw funnel at the temperature of 140° C.

When loading is over it is kept for 8 hours at 140° C. The IR analysis of the obtained product shows the transformation of the fluoroacylic end groups into carboxylates (1680 cm$^{-1}$).

We claim:

1. Process for preparing polyoxyperfluoroalkanes having one or two end groups selected from —$OCF_2$H, —$OCF_2CF_2$H and —$OCF(CF_3)$H and a number average molecular weight lower than 1800, said process consisting essentially of decarboxylating the salts formed by the corresponding polyoxyperfluoroalkanes having one or two end groups selected from —$OCF_2COOZ$, —$OCF_2CF_2COOZ$ and —$OCF(CF_3)COOZ$, wherein Z is a monovalent cation, in the presence of a medium consisting essentially of water, at temperatures from 140° to 170° C. and under a pressure of at least 4 atmospheres.

2. Process according to claim 1, wherein the polyoxyperfluoroalkanes are formed by fluorooxyalkylene units selected from

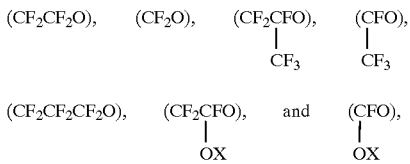

wherein X is —$(CF_2)_n CF_3$ and n=0, 1, 2, 3, 4, said units being statistically distributed in the polymeric chain, having the end groups indicated in claim 1.

3. Process according to claim 2, wherein the polyoxyperfluoroalkane salts to be decarboxylated are selected from the structures:

$RfO(CF_2CF_2O)_m(CF_2O)_n CF_2COOZ$ and $RfO(CF_2CF(CF_3)O)_p(CF_2O)_n(CF(CF_3)O)_q CF_2COOZ$ wherein m, n, p, and q have average values such as to have a number average molecular weight lower than 1500 and wherein Rf is —$CF_3$ or —$CF_2CO$—OZ.

4. Process according to claim 1 wherein the monovalent cation is selected from ammonium and alkaline metals.

5. Process according to claim 4 wherein the alkaline metal is potassium.

6. Process according to claim 1 wherein the decarboxylation temperature is 150°–160° C.

7. Process according to claim 1, wherein the pressure is comprised between 6 and 10 atmospheres.

8. Process according to claim 1 wherein the polyoxyperfluoroalkanes salts to be decarboxylated are prepared in situ by reacting the corresponding polyoxyperfluoroalkanes having one or two end groups selected from —$OCF_2COF$, —$OCF_2CF_2COF$ and —$OCF(CF_3)COF$ with stoichiometric amounts of alkaline metals or ammonium hydroxides in aqueous solution.

* * * * *